(12) United States Patent
Davis et al.

(10) Patent No.: US 8,241,395 B2
(45) Date of Patent: *Aug. 14, 2012

(54) GLASS-CERAMIC MEMBRANES

(75) Inventors: Mark J. Davis, Clarks Summit, PA (US); Samuel David Conzone, Medina, OH (US); Paula Vullo, Pittston, PA (US)

(73) Assignee: Schott Corporation, Elmsford, NY (US)

( * ) Notice: Subject to any disclaimer, the term of this patent is extended or adjusted under 35 U.S.C. 154(b) by 865 days.

This patent is subject to a terminal disclaimer.

(21) Appl. No.: 12/136,816

(22) Filed: Jun. 11, 2008

(65) Prior Publication Data

US 2009/0000473 A1 Jan. 1, 2009

Related U.S. Application Data

(60) Provisional application No. 60/929,065, filed on Jun. 11, 2007.

(51) Int. Cl.
*B01D 53/22* (2006.01)
*C03C 21/00* (2006.01)
*C04B 35/626* (2006.01)
*C04B 35/64* (2006.01)

(52) U.S. Cl. ............... 95/55; 95/45; 95/56; 96/4; 96/10; 96/11; 65/32.3; 65/33.1; 65/33.9; 65/60.4; 501/2; 501/4

(58) Field of Classification Search ............... 95/45, 55, 95/56; 96/4, 8, 10, 11; 65/32.1, 32.3, 33.1, 65/33.4–33.9, 60.4; 501/2–10; 55/523, 524, 55/DIG. 5
See application file for complete search history.

(56) References Cited

U.S. PATENT DOCUMENTS

| 3,170,805 | A | | 2/1965 | McMillan et al. |
|---|---|---|---|---|
| 3,231,456 | A | | 1/1966 | Hodgson et al. |
| 3,464,806 | A | | 9/1969 | Seki et al. |
| 3,490,887 | A | | 1/1970 | Herczog et al. |
| 3,704,110 | A | | 11/1972 | Finn et al. |
| 3,790,360 | A | * | 2/1974 | Kato et al. ................ 65/33.3 |
| 3,802,892 | A | | 4/1974 | Pirooz |
| 3,876,407 | A | * | 4/1975 | Hirose et al. ................ 65/33.4 |
| 3,892,904 | A | | 7/1975 | Tanaka |
| 3,914,517 | A | | 10/1975 | Pirooz |
| 4,030,903 | A | * | 6/1977 | Rittler ................ 65/32.4 |
| 4,084,972 | A | * | 4/1978 | Andrus et al. ................ 65/33.7 |
| 4,134,747 | A | * | 1/1979 | Pierson et al. ................ 501/5 |
| 5,932,361 | A | * | 8/1999 | Belyakov et al. ................ 501/5 |
| 7,648,656 | B2 | | 1/2010 | Borrelli et al. |
| 2009/0000473 | A1 | | 1/2009 | Davis |
| 2009/0107330 | A1 | * | 4/2009 | Gu ................ 95/55 |
| 2009/0242382 | A1 | * | 10/2009 | Lipinska-Kalita et al. ................ 204/157.52 |

OTHER PUBLICATIONS

Bansal, N.P., A.J. Bruce, R.H. Doremus, and C.T. Moynihan, The Influence of Glass Composition on the Crystal-Growth Kinetics of Heavy-Metal Fluoride Glasses, Journal of Non-Crystalline Solids, 70 (3), 379-396, 1985.

Cabral, A.A., V.M. Fokin, and E.D. Zanotto, Nanocrystallization of fresnoite glass. II. Analysis of homogeneous nucleation kinetics, Journal of Non-Crystalline Solids, 343 (1-3), 85-90, 2004.

(Continued)

*Primary Examiner* — Jason M Greene
(74) *Attorney, Agent, or Firm* — Millen, White, Zelano & Branigan, P.C.

(57) ABSTRACT

Disclosed are processes for preparing conductive glass-ceramic membranes and methods of using them in hydrogen or proton separation.

22 Claims, 7 Drawing Sheets

Segregation Approach

Example of grain boundary wetting

Desired microstructure

OTHER PUBLICATIONS

Cabral, A.A., V.M. Fokin, E.D. Zanotto, and C.R. Chinaglia, Nanocrystallization of fresnoite glass. I. Nucleation and growth kinetics, Journal of Non-Crystalline Solids, 330 (13), 174-186, 2003.

Chakravorty, D., S. Basu, P.K. Mukherjee, S.K. Saha, B.N. Pal, A. Dan, and S. Bhattacharya, Novel properties of glass-metal nanocomposites, Journal of Non-Crystalline Solids, 352 (6-7), 601-609, 2006.

Das, G.C., T.K. Reddy, and D. Chakravorty, Electro-Conducting Glass-Ceramics Produced by Ion-Exchange and Reduction Treatments, Journal of Materials Science, 13 (10), 2211-2216, 1978.

Mastelaro, V.R., and E.D. Zanotto, Anisotropic residual stresses in partially crystallized Li2O-2SiO2 glass-ceramics, Journal of Non-Crystalline Solids, 247, 79-86, 1999.

Pal, B.N., T.K. Kundu, S. Banerjee, and D. Chakravorty, Humidity sensing by nanocomposites of silver in silicate glass ceramics, Journal of Applied Phisics, 93 (7), 4201-4206, 2003.

Prado, M.O., and E.D. Zanotto, Concurrent sintering and crystallization of glass spheres, Glass Science and Technology-Glastechnische Berichte, 73, 194-196, 2000.

Zanotto, E.D., and P.F. James, Experimental Test of the General-Theory of Transformation Kinetics—Homogeneous Nucleation in a BaO.2SiO2 Glass, Journal of Non-Crystalline Solids, 104 (1), 70-72, 1988.

U.S. Appl. No. 11/806,606, filed Jun. 1, 2007.

Moulson A.J. et al. "Electroceramics" Second Edition, Materials, Properties, Applications, 2003.

Maier, J. "Physical Chemistry of Ionic Materials Ions and Electrons in Solids" 2004.

Barsoukov E. et al., "Impedance Spectroscopy Theory, Experiment, and Applications" Second Edition, Wiley-Interscience 2005.

Final Office Action dated Dec. 7, 2010 in related U.S. Appl. No. 11/806,606, filed Jun. 1, 2007.

Response filed on Jun. 7, 2011 in related U.S. Appl. No. 11/806,606, filed Jun. 7, 2011.

1.132 Declaration (M.J. Davis) filed on Jun. 7, 2011 in related U.S. Appl. No. 11/806,606, filed Jun. 7, 2011.

Resume of M.J. Davis in related U.S. Appl. No. 11/806,606, filed Jun. 7, 2011.

\* cited by examiner

Figure 1. Comparison of lithium disilicate (Example 1 = "L2S") +/- added silver +/- added sugar experiments: (a) denotes increase in conductivity in going from glassy L2S to fully crystalline L2S; (b) indicates that simply adding silver to the L2S composition has no effect on composition, nor does the furnace atmosphere; (c) shows that the addition of sugar as a reducing agent, particularly with a reducing furnace atmosphere, has a pronounced effect on the resulting conductivity. (note: conductivity is the reciprocal of resistivity.)

Figure 2. Example of resistance behavior from Example 1 composition. Silver paint electrodes are used for the resistance measurement on an HP4339a High Resistance Meter (as for Figure 1 data as well).

FIGURE 3. Grain Boundary Calculations grain boundary thickness

- Number of grain boundaries in block = $3L/d$
- Volume of each grain boundary = $L^2 t$
- Thus, total volume of grain boundaries in block = $(3L/d)(L^2 t)$ = $3L^3 t/d$
- Volume fraction of grain boundaries = $(1/L^3)(3L^3 t/d)$ = $3t/d$ Example: *10 nm grain boundaries with 3 micron grains*

$\Rightarrow$ *1 vol% grain boundaries* ($\Rightarrow$ _thin grain boundaries can still lead to significant vol% metal_)

Assumed: grain boundary density = 11.5 gm/cm$^3$
matrix density = 2.5 gm/cm$^3$

*Weight fraction* of grain boundaries has a non-linear dependence on grain-boundary volume fraction

Figure 4. Segregation Approach

Figure 5.    Bulk Ion-Exchange Approach

Figure 6.    Powder Ion-Exchange Approach

Figure 7. <u>Co-Sintering Approach</u>

GLASS-CERAMIC MEMBRANES

This application claims the benefit of the filing date of U.S. Provisional Application Ser. No. 60/929,065 filed Jun. 11, 2007, which is incorporated by reference herein.

Electrically-insulating, thermally stable, and chemically durable glass-ceramics have been known to materials developers for many years. On the other hand, electrically conductive glass-ceramics (i.e., conductance>$10^{-4}$ S/cm), though known, tend to be neither thermally stable nor chemically durable.

Surprisingly, per this invention, addition of a suitable conductive element (e.g., a metal, such as silver) to a glass composition—in the presence of a suitable reducing agent—can lead to a highly conductive glass-ceramic. Moreover, the resultant glass-ceramic exhibits superior thermal and chemical properties as compared with existing conductive glass-ceramics.

The highly conductive glass-ceramics prepared according to the methods disclosed herein, e.g., the segregation method, the ion exchange method, and a method of Conzone et al. (1998), are preferably used for preparation of hydrogen or proton separation membranes with a metal, preferably with, Pd, Ag—Pd, Ag or Cu—Pd alloys, more preferably with, Pd, Ag—Pd, or Cu—Pd alloys.

The "Materials and Methods" section of Conzone et al. (1998), teaches a procedure by which a "co-sintered" body is made by mixing glass with $ReO_2$ powder. The disclosure of Conzone et al. is incorporated herein by reference in its entirety, and especially the section "Materials and Methods." A similar procedure can be used to prepare hydrogen separation membranes with a metal, preferably with, Ag, Pd, Cu—Pd or Ag—Pd, more preferably with, Pd, Ag—Pd, or Cu—Pd alloys.

The processes of the disclosure can be used on a wide variety of glass-ceramics, and the use thereof is not restricted to any one specific glass-ceramic composition. Any glass-ceramic system that produces phases that strongly reject the conductive metallic species will be amenable to the approaches of the processes disclosed herein. This includes, e.g., resultant formation of crystals in which the metals reside and/or a second liquid, during phase separation. Preferred glass-ceramics are disclosed in, for example, Zanotto and James, 1988, Mastelaro and Zanotto, 1999, Holand and Beall, 2002, Bansal et al., 1985, the disclosures of which are incorporated herein by reference.

Typically, transition and noble metal ions or metallic clusters in glasses do not form an interconnected pathway in the material, thereby precluding significant conductivity. Disclosed herein are methods which not only attain relatively high level of retained metals in the precursor glass, but also attain an interconnected microstructure of the metallic species thereby ensuring significant conductivity. Unique processing routes are available for glasses that have been crystallized in a controlled manner—glass-ceramics—which can yield a fundamentally different set of material properties than the precursor glass, including optical, mechanical, and electrical properties.

This invention involves two methods for achieving electrical conductivity: 1) the metallic species could be incorporated into the crystals of the glass ceramic; or b) the species could be largely rejected from the crystals and retained in the residual glass (if there is any; if no residual glass remains, then the metallic species would reside entirely at crystalline grain boundaries, thereby forming an interconnected network). In the former case, depending on the overall chemistry and defect structure of the crystal, the resulting conductivity (either electronic or ionic) could be either enhanced or reduced. In the latter case, with the metallic species residing partially or wholly in the residual glass, the resulting conductivity would depend on the oxidation state and interconnectivity of the metal species along grain boundaries, the extent of crystallization preferably being high so that the residual glass phase is highly enriched in the metallic species.

Mechanical properties of the glass-ceramic compositions include, e.g., the ability of the material to be machined into thin (1 mm) plates, e.g., for test purposes, and electrical properties include, e.g., DC conductivity at ambient and elevated temperatures (e.g., up to 400° C.).

The glass-ceramic membranes according to the present invention are useful for separation & purification of materials, hydrogen production, storage, delivery and use.

Interested sectors in the above uses are e.g., international workshops, industry, utilities and academia.

The technical and economical assessment: reasoning; description of the technology needs; and US-DOE's performance targets are summarized in the table below.

| | Unit | 2005 | 2010 | 2015 |
|---|---|---|---|---|
| Flux Rate | $cm^3/min/cm^2$ | 50 | 100 | 150 |
| Equivalent Pd membrane thickness (300° C.) | microns | 12 | 5.8 | 3.8 |
| Equivalent Pd membrane thickness (900° C.) | microns | 46 | 23 | 16 |
| Module Cost* | $k\$/m^2$ | 4.3 to 16.2 | 2.2 to 10.8 | <1.1 to 5.4 |
| Durability | yrs | 1 | 3 | >5 |
| Differential Pressure | bar | 14 | 27 | 28 to 68 |
| Hydrogen Recovery | % total | >70 | >80 | >90 |
| Hydrogen Purity | % total dry gas | >99.9 | >99.95 | >99.99 |

Adapted from DOE Hydrogen MYTP 2006
DOE target temperature > 800° C.
*Combines membranes and dense metallic membranes

| | | | Current status | | | | |
|---|---|---|---|---|---|---|---|
| | Unit | DOE 2010 spec | Dense metallic membranes | Microporous membranes | Porous carbon | Dense ceramic | Cermet |
| Flux Rate | $cm^3/min/cm^2$ | 100 | 30 | 50 | 27 | 11 | 20 |
| Module Cost | $k\$/m^2$ | 2.2 to 10.8 | 21.5 | 5.9 | | | |
| Durability | yrs | 3 | <1 | <1 | | | |
| Differential Pressure | bar | 27 | 6.8 | 6.8 | | | |
| Usage Temperature | ° C. | >800 | 300-600 | 200-600 | 500-900 | 600-900 | 500-900 |

-continued

|  | Unit | DOE 2010 spec | Current status | | | | |
|---|---|---|---|---|---|---|---|
|  |  |  | Dense metallic membranes | Microporous membranes | Porous carbon | Dense ceramic | Cermet |
| Hydrogen Recovery | % total | >80 | 60 | 60 | low | high | high |
| Hydrogen Purity | % total dry gas | >99.95 | >99.9 | >99.9 | | | |
| Hydrogen Selectivity* | none | >2000 | >1000 | >1000 | | | |

*Selectivity defined as ratio of hydrogen flux to that of all other gases

The needs include a pore-free, high-flux rate (>100 cm$^3$/min/cm$^2$), cost-effective (<2 k$/m$^2$), and refractory (>800° C.) material that can be used at differential pressures exceeding 20 bars.

There are various considerations, e.g., pros and cons, of hydrogen separation membranes

| Material Families | Strengths | Limitations |
|---|---|---|
| Dense metallic membranes | inherently high flux rates | high cost |
| Metal-coated porous ceramic membranes | durability | strength and durability limited T range (?) limited diff. Pressure (?) |
| Cermet | high flux rate temperature stability | composite issue (e.g., porosity, cracking) processing to reduce thickness |
| This invention | relatively low-cost pore-free (for some scenarios) flexible glass processing methods |  |

Two processing methods included in the invention are the segregation method and the ion exchange method. Using either method, a connective pathway for conduction is achieved.

Method 1 ("Segregation")

The segregation process relies on the finite solubility for the desired conductive species in the as-made glass. As an example, the volume fraction of residual glass in a brick-layer model of a highly-crystalline glass-ceramic can be shown to be given by 3t/d, where t is the grain boundary thickness and d is the average grain size. Thus, a glass-ceramic with 3-micron grains and 10 nm-thick grain boundaries contains 1% volume fraction of grain boundaries. If the nominal solubility of the desired metal species is significantly less than this amount, the grain boundaries will not be completely covered by a conductive species and a connective microstructure may not result.

Figure 3:
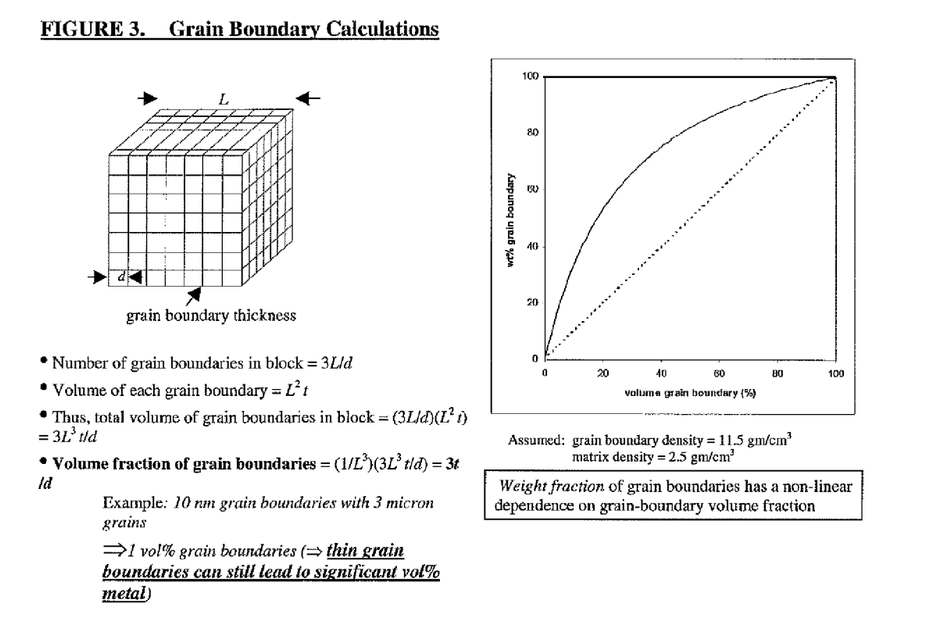
FIG. 3 illustrates grain boundary calculations.
Figure 4:
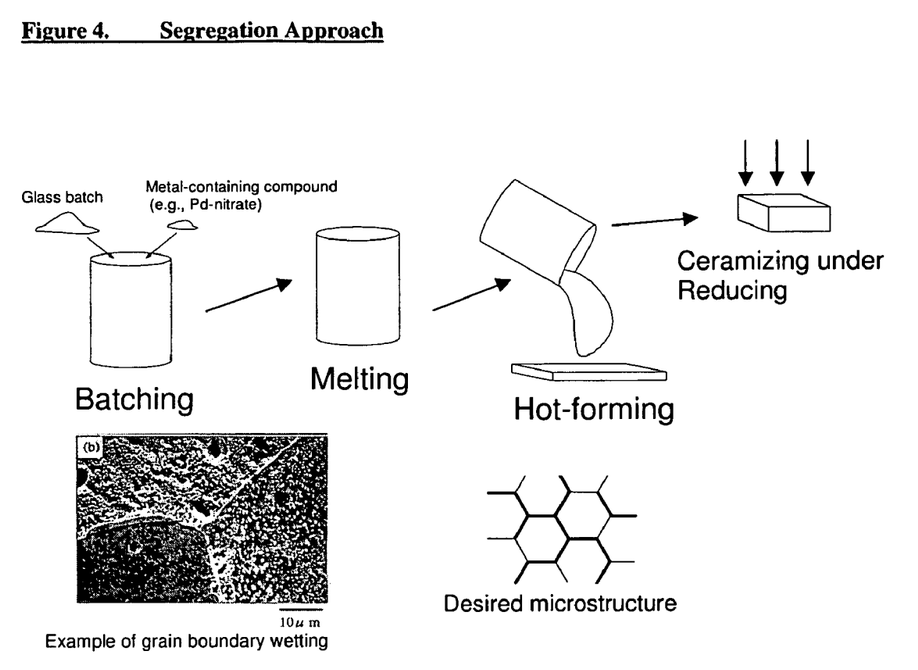
FIG. 4 illustrates segregation approach.
Figure 5:
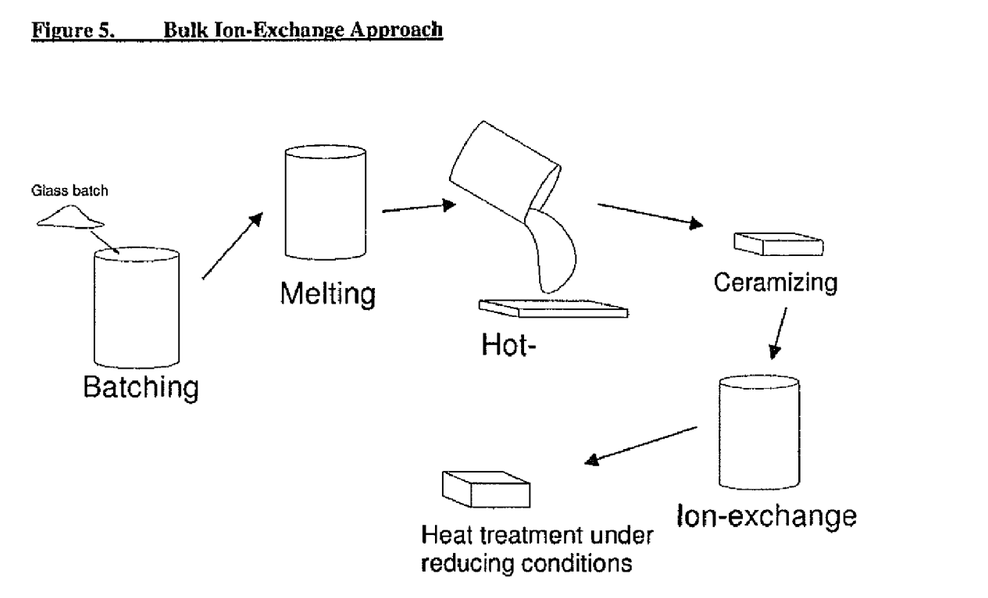
FIG. 5 illustrates bulk ion-exchange approach.
Figure 6:
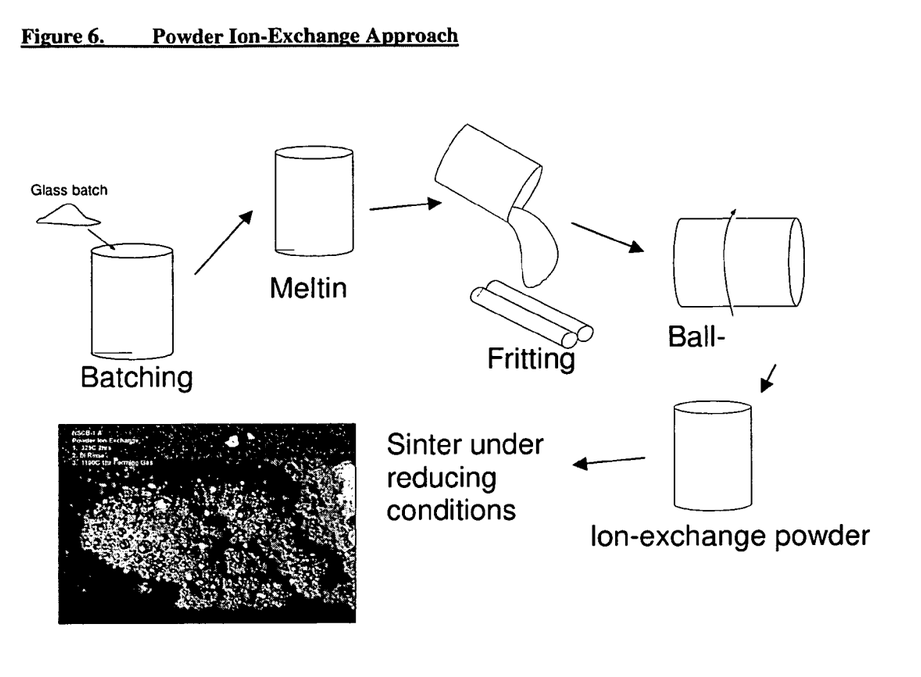
FIG. 6 illustrates powder ion-exchange approach.
Figure 7:
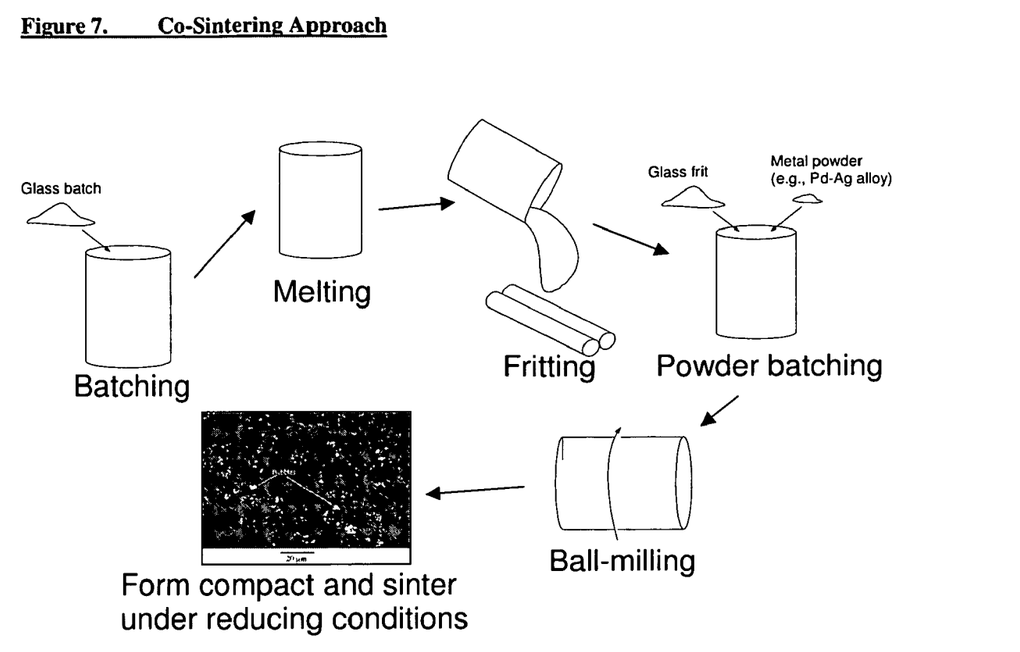
FIG. 7 illustrates co-sintering approach.

FIG. 3 demonstrates in more detail the grain boundary calculations:

This process involves preparation of a glass that contains significant amounts e.g., more than 0.01%, preferably 0.1% to 10%, more preferably 1% to 5%, by weight of the desired metallic species, e.g., silver, palladium, copper, iron, manganese, vanadium, chromium, nickel, cobalt, platinum, gold, etc., followed by appropriate thermal processing under suitable atmosphere control to produce a conductive glass-ceramic. The thermal processing is designed to lead to a high degree of crystallization of a phase with a nominally low solubility of that metal species. By low solubility is meant that the crystal phase incorporates <1%, preferably <0.1%, and more preferably <0.01% of the available conductive metal species. This can be engineered conventionally in advance via consideration of the charge and ionic radii of the relevant metallic species and the various sites in the crystallographic framework of the crystal. Additionally, processing can be controlled to ensure that the desired charge of the conductive species is attained. (X-ray diffraction can be used to characterize the presence or absence of incorporated metal species into the crystal structure.) The process can also employ, conventionally, suitable batch materials, e.g., reducing and/or oxidation agents (e.g., sugar as a reducing agent and/or ammonium nitrate as an oxidizing agent) and/or appropriate cover and/or bubbling gas during melting (e.g., oxygen, nitrogen, argon). Additionally, an appropriate conventional cover gas may be used during ceramization (e.g., an $H_2$—$N_2$ mixture ("forming gas"). To ensure the presence of an interconnected conductive framework, a very high-degree of crystallization can be attained via a two part thermal cycle: e.g., 1) thermal treatment for 1 to 4 hours at or near the temperature of maximum crystal nucleation (typically some 50° C. above the glass transition temperature); and 2) a second thermal hold for 1 to 4 hours at a temperature at or above the temperature of a crystallization exotherm as deduced from a thermal analysis. In some cases, a one-step thermal treatment is suitable in which the initial "nucleation" step can be avoided. This is particularly relevant for cases in which a larger grain size is desired. In general, changing the temperatures and times for both dwell points allows for control of grain size and total grain boundary area. This low solubility segregation of the metal species to the grain boundaries will thus form an interconnected network when suitable wetting of the grain boundaries by the metallic species occurs.

Figure 1:
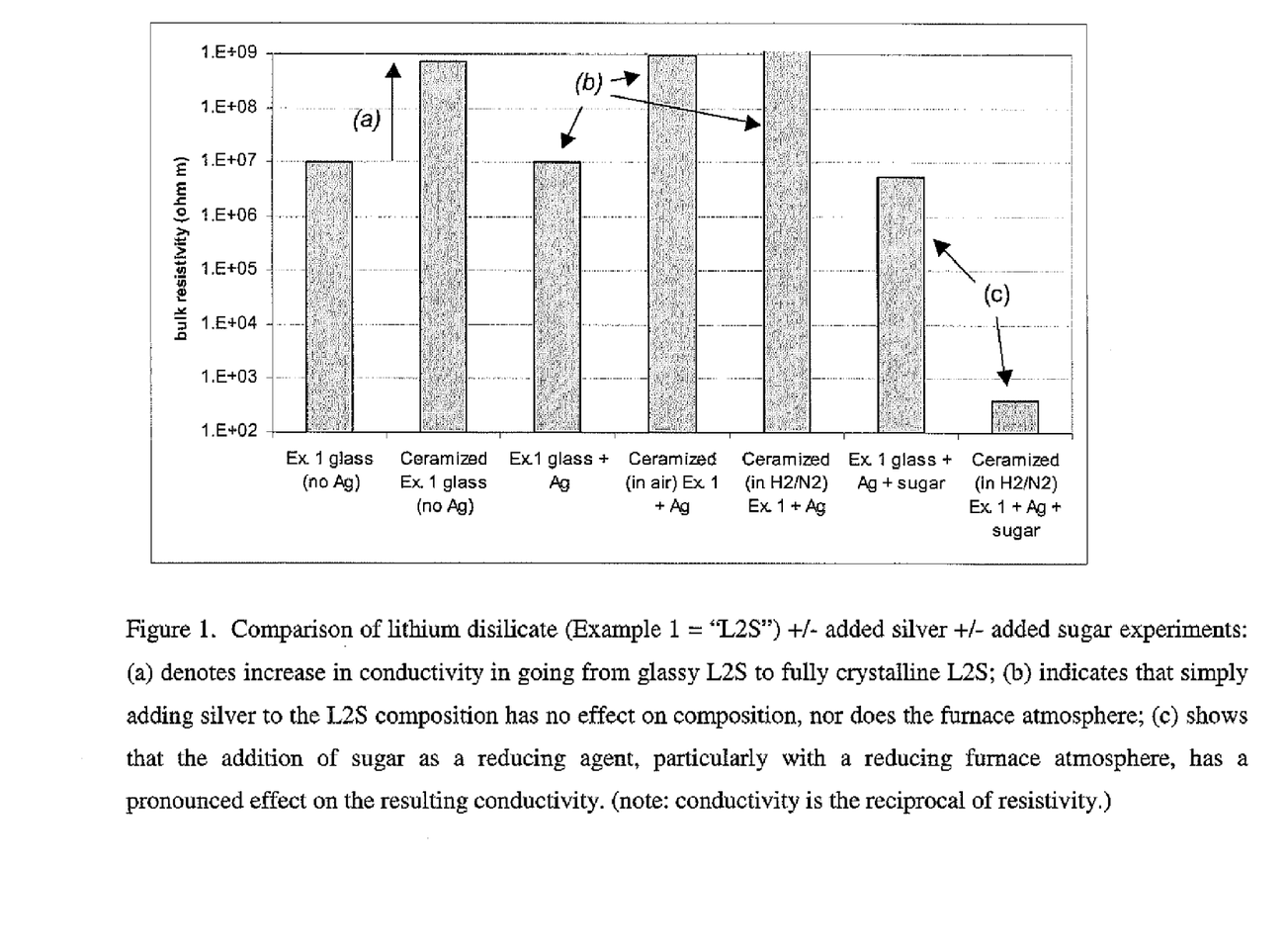
FIG. 1 illustrates the resistivity of various glasses, and glass-ceramics.

Experiments conducted include experiments using the segregation approach, using a $Li_2O$-$2SiO_2$ (molar) model composition +/−1 wt % added AgCl and +/− added sugar as a reducing agent (See Example 1, Table 1). Subsequent heat treatments in air or in a reducing atmosphere (5.5% $H_2$/94.5% $N_2$; "forming gas") show that both sugar and a reducing atmosphere are preferred to induce a significant change in conductivity and that this effect (increase in conductivity or equivalently a decrease in resistivity) can be as large as 5 orders of magnitude from that of the starting glass and nearly 7 orders of magnitude from that of the fully crystallized glass-ceramic which is Ag-free (see FIG. 1).

Figure 2:
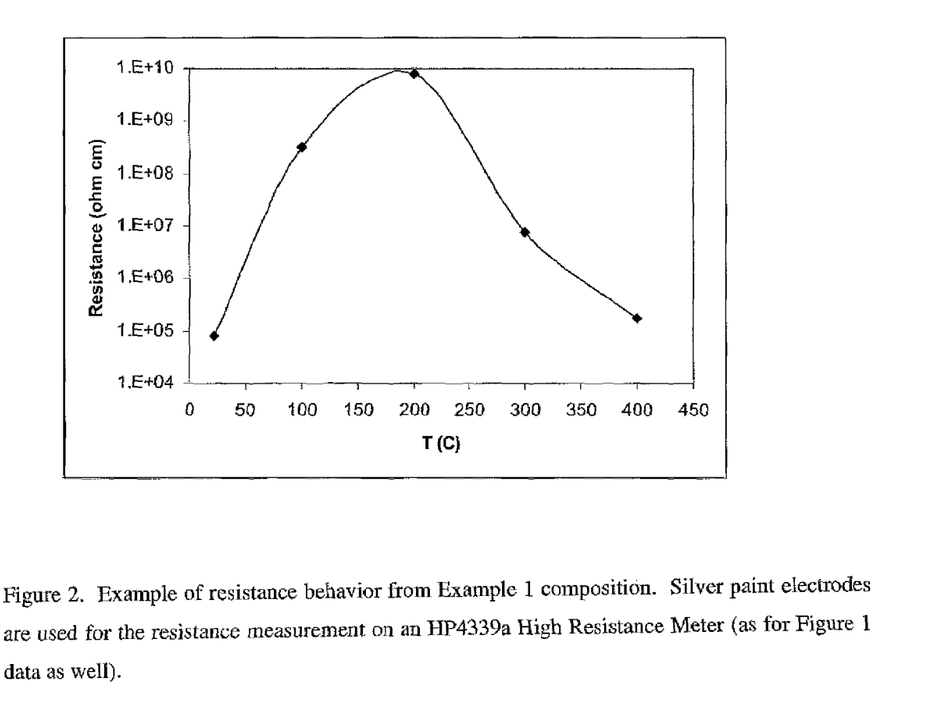
FIG. 2 illustrates the resistance behavior of the composition of example 1 as a function of temperature.

Additionally, one of the more conductive samples exhibited resistance behavior analogous to a positive-temperature-coefficient resistor (PTCR), normally associated with semiconductors but also observed with polycrystalline barium titanate ($BaTiO_3$) (see FIG. 2; Moulson and Herbert, 2003). In the case of barium titanate, the PTCR behavior is related to its ferroelectric nature and its ability to produce a spontaneous polarization (Newnham, 2005). In the current examples, there are no ferroelectric phases present, but lithium disilicate—the dominant crystalline phase in the examples herein—is a polar, acentric phase, and is thus, also capable of producing a spontaneous polarization. However, unlike ferroelectrics, its domain structure, and thus, its polar direction cannot be altered via application of an electric field.

Additionally, with the segregation process, alkali-free compositions can be achieved, where the conduction mechanism may be constrained to be strictly electronic in origin.

In an embodiment, the material for the segregation process is not fresnoite ($Ba_2TiSi_2O_8$).

Segregation of conductive species in glass-ceramics per the present invention allows for the tailoring of specific conductive elements according to a particular use or purpose, for example. The highly-crystalline nature of these materials leads to superior mechanical strength.

Method 2 ("Ion Exchange")

Ion exchange is a known procedure to introduce a metallic species into a glass (see, e.g., Ag; Bartholomew, 1991). Das et al (1978), in particular, examined the use of ion-exchange on glass surfaces to produce conductive glass-ceramics. Due to the relative slowness of the process, characteristic depth of ion penetration was only some 100's of microns for typical and convenient times and temperatures. For example, using the composition in Table 1 (Example 2), an ion-exchange time of 69 days would be required to completely penetrate a 0.5 mm-thick sample at 300° C.; increasing the temperature to 350° C.—about the thermal limit of the silver nitrate bath—decreased the time necessary to 11 days. In order to more efficiently produce bulk conductive materials, an alternate method of ion exchange is disclosed herein, taking advantage of the inherent generally small characteristic length-scale of particulates that make up powders.

The following table summarizes in more detail the ion-exchange properties related to ionic radii and charges:

|  | Ion | | | | |
| --- | --- | --- | --- | --- | --- |
|  | Pd | Ag | Li | Na | K |
| Valence | +2 | +4 | +1 | +1 | +1 |
| Radii (Å) | 0.86 | 0.62 | 1.15 | 0.74 | 1.02 | 1.38 |

Experiments included in particular, a precursor, micron-sized glass powder which was produced following the composition of Das et al. (Table 1). This powder was then ion exchanged in a time-efficient manner ($AgNO_3$ bath, 400° C. for 6 hrs), leading to significant ion exchange of each particulate (sodium for silver exchange). This powder was rinsed with de-ionized water several times in order to remove all of the silver that did not diffuse into the particles. Other suitable rinsing solvents may be used. The resulting slurry was dried in an oven to remove all of the water. The powder was then sintered under forming gas and the resulting crystalline phases were shown to consist largely of reduced silver and bismuth, with lesser amounts of silicate phases (1,100° C. for 1 hr in a 5% $H_2$-95% $N_2$ gas mixture).

According to the present invention, preferably ion exchange of glass powders is followed by ceramization/sintering, and not the other way around. A reason is that ion exchange is generally much faster for glasses than for compositionally identical (crystalline) glass-ceramics. As an example, glassy and ceramized (1 hr at 1000° C.) samples of $Li_2O$-$2SiO_2$ composition were simultaneously ion-exchanged in a $AgNO_3$ bath at 350° C. for three hours. Silver depth-of-penetration was subsequently measured by SEM with the following results: 160 micron depth for the glass but only 6.5 micron for the glass-ceramic, a difference of nearly 25×. Additionally, sintering is typically much more efficient for glasses than for glass-ceramics, owing to the ability for glass to more easily flow and compact as opposed to partially or wholly crystalline materials.

The ion-exchange process can be used, for example, on inexpensive commercially available, soda-lime-silicate glass powder (e.g., $SiO_2$=71-73 wt %; $Na_2O$+$K_2O$=12-14 wt %; CaO+MgO=11-16 wt %; and $Al_2O_3$=0.5-1.5 wt %). Such glass types are efficient media for silver ion exchange.

The ability to have conductive species penetrate (significantly to fully), through ion exchange, (for example, Ag exchanged for an alkali species, e.g., Na), small glass particulates in a short amount of time obviates the need for protracted ion-exchange treatments. Furthermore, the use of glass powder, as opposed to a glass-ceramic powder, leads to an enhanced sintering ability.

The ion-exchange process in conjunction with a satisfactory sintering process can yield a mechanically robust material.

Depending on the final conductivity levels of the obtained materials using a process of the invention, and exact nature of the conduction mechanism (i.e., electronic vs. ionic), there is a large variety of applications for the glass-ceramics produced by the methods of the present invention. For example, if, in the case of Li-rich glass-ceramics the dominant conduction mechanism is due to Li-ion mobility, chemically-durable, solid-state Li-ion batteries are one application. On the other hand, if the dominant mechanism is electronic and if suitably refractory glass-ceramic compositions are selected, mechanically-robust, high-temperature ohmic heating elements can be fabricated. In sum, depending on the choice of the underlying composition, the choice of process and process parameters, the materials produced by processes of the invention are useful in a wide variety of applications. Generally, where other conductive glasses and/or glass-ceramics may be used, the materials produced by the processes of the invention can be used.

The glass-ceramics of the present invention are useful for hydrogen separation membranes. Hydrogen separation membranes according to the present invention can be achieved by three approaches, which can be in parallel.
1. Segregation of appropriate metals (e.g., Ag—Pd) along grain boundaries during high degrees of crystallization for selected compositions
2. Combined ion-exchange (e.g., Ag—Pd) and heat treatment under a reducing atmosphere
3. Co-sintering of glassy powder+metal (e.g., Ag—Pd) to produce a high metal content-containing glass-ceramic These approaches are illustrated in FIGS. 4-7:

The segregation approach provides various advantages, e.g.:

Offers the potential to tailor chemistry of matrix and metal to achieve design specifications;
Refractory, pore-free, and takes advantage of glass-forming capabilities;
Simplest processing of all candidate methods, and may have low cost;

Certain considerations regarding the segregation approach include:

Amount of metal limited by solubility limits of glass (probably <10 wt %), thereby limiting maximum attainable H permeability to ~10% of the permeability of pure Pd;
In optimal circumstances, it requires metal species to remain non-oxidized and to wet crystalline grain boundaries;
Ability to form an interconnected metal framework.

The ion-exchange approach provides various advantages, e.g.:

Processing flexibility of glass;
Higher levels of final metal content possible (up to total initial alkali content of the glass);

Ability to independently tailor glass and bath chemistry.

Certain considerations regarding the ion-exchange approach include:

Flux rate may be low;

Ability to form an interconnected metallic network.

The co-sintering approach provides various advantages, e.g.:

Starts with a (simple) glass-frit precursor;

High flux rate should be possible due to high allowable metal contents;

Ability to independently tailor glass and metal alloy chemistry;

Porosity should be easier to control as compared to cermet approach.

Certain considerations regarding the co-sintering approach include:

Multiple processing steps, which may lead to relatively high cost;

Achieving pore-free state;

Composite nature could lead to cracking issues, etc.;

Post-sintering must be sufficient to drive off any retained volatile components (organic binders, etc) while maintaining structural integrity of glass-ceramic and electrical conductivity (e.g., metal must be reduced, though this should be enhanced by presence of any organics when they decompose).

Glass-ceramic membranes according to the invention can be achieved with highly-crystalline systems. Virtually any glass-ceramic can be ceramized to ~100% crystallinity given suitable temperature and time. Realized examples include both stoichiometric and non-stoichiometric compositions:

Lithium disilicate ($Li_2O$-$2SiO_2$): via suitable two-stage heat treatments, this system is easily transformed to 100% crystallinity (many reports);

Soda-lime ($Na_2O$-$2CaO$-$3SiO_2$): Zanotto and Galhardi (1988) report crystallinities >90% as determined both optically and via XRD;

Sodium-niobates ($Na_2O$—$Nb_2O_5$—$SiO_2$): heat treatment of samples at temperatures ~1000° C. typically leads to ~100% crystallinities.

EXAMPLES

Example 1

The Segregation Process

Silicon dioxide and lithium carbonate powders with and without added silver nitrate and powdered sugar are mixed together and then melted and refined at a temperature of about 1400° C. for 3 hours. The hot glass is then poured into a steel mold and then placed into an annealing furnace at about 450° C. and cooled to room temperature at 30K/hr to relieve stress. Following this, the glass casting is cut into smaller pieces for testing purposes. Pieces are then ceramized at 1000° C. for 10 hours. Some are ceramized in air whereas others are ceramized in a 5% $H_2$-95% $N_2$ forming gas. Following this, silver paste electrodes are painted on the sample, air-dried, and electrical resistance measurements are conducted. See results summarized in FIG. 1.

Example 2

The Ion-Exchange of Powder Process

Similarly to Example 1, suitable oxides, carbonates, and nitrates are mixed together and subsequently melted at about 1400° C. for several hours. After this, a powder is made using mechanical means. No particle classification is carried out; the average particle size is about 50 microns. Following this, the powder is ion-exchanged in a silver nitrate bath at 325° C. for 2 hours. The silver nitrate solution is then poured off and the resulting ion-exchanged powder is rinsed in de-ionized water three times and dried on a Pt sheet at 150° C. for 2 hrs. The powder is then placed into a graphite mold, tamped down by hand, and then ceramized in forming gas at a temperature of 1100° C. for 1 hr. The resultant sintered ceramic is not densely packed but visual inspection and SEM analysis reveals the presence of a considerable amount of reduced silver and bismuth which form near-perfect spheres embedded within and between highly crystallized glass-ceramic material.

The compositions from examples 1 and 2 are shown in Table 1. The "+/−" denotes that the noted constituent is used in some, though not all, of the test melts (see FIG. 1).

TABLE 1

| Constituent (wt %) | Example 1 | Example 2 |
|---|---|---|
| $SiO_2$ | 80.1 | 45.9 |
| $Li_2O$ | 19.9 | |
| $Na_2O$ | | 21.5 |
| CaO | | 13.2 |
| $Bi_2O_3$ | | 19.4 |
| $Ag_2O$ | +/−1 | |
| Sugar | +/−1 | |

BRIEF DESCRIPTION OF DRAWINGS

Various features and attendant advantages of the present invention will be more fully appreciated as the same becomes better understood when considered in conjunction with the accompanying drawings, in which like reference characters designate the same or similar parts throughout the several views.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosure[s] of all applications, patents and publications, cited herein are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions. Publications relevant may be Chakravorty et al., 2006; Pal et al., 2003; Prado and Zanotto, 2000; Doremus, 1994, which are all incorporated herein by reference. U.S. Pat. No. 6,485,622 and US2003/0205467A1 disclose Li-ion conductive glass-ceramics, methods of making them, and uses thereof, which are all incorporated herein by reference.

Citations:

Bansal, N. P., A. J. Bruce, R. H. Doremus, and C. T. Moynihan, The Influence Of Glass Composition On The Crystal-Growth Kinetics Of Heavy-Metal Fluoride Glasses, *Journal Of Non-Crystalline Solids,* 70 (3), 379-396, 1985.

Bartholomew, R. F., Ion-exchange, in *Engineered Materials Handbook;* Volume 4: *Ceramics and Glasses*, edited by S. J. Schneider, pp. 460-463, ASM International, Materials Park, Ohio, 1991.

Chakravorty, D., S. Basu, P. K. Mukherjee, S. K. Saha, B. N. Pal, A. Dan, and S. Bhattacharya, Novel properties of glass-metal nanocomposites, *Journal Of Non-Crystalline Solids,* 352 (6-7), 601-609, 2006.

Das, G. C., T. K. Reddy, and D. Chakravorty, Electro-Conducting Glass-Ceramics Produced By Ion-Exchange And Reduction Treatments, *Journal Of Materials Science,* 13 (10), 2211-2216, 1978.

Doremus, R. H., *Glass Science,* 339 pp., John Wiley and Sons Inc., New York, 1994.

Holand, W., and G. H. Beall, Glass-Ceramic Technology, 372 pp., The American Ceramic Society, Westerville, 2002.

Mastelaro, V. R., and E. D. Zanotto, Anisotropic residual stresses in partially crystallized Li2O-2SiO2 glass-ceramics, *Journal Of Non-Crystalline Solids,* 247, 79-86, 1999.

Moulson, A. J., and J. M. Herbert, *Electroceramics,* 557 pp., Wiley, Sussex, 2003.

Newnham, R. E., *Properties of Materials: Anisotropy, Symmetry, Structure,* 378 pp., Oxford University Press, Oxford, 2005.

Pal, B. N., T. K. Kundu, S. Banerjee, and D. Chakravorty, Humidity sensing by nanocomposites of silver in silicate glass ceramics, *Journal of Applied Physics,* 93 (7), 4201-4206, 2003.

Prado, M. O., and E. D. Zanotto, Concurrent sintering and crystallization of glass spheres, *Glass Science And Technology-Glastechnische Berichte,* 73, 194-196, 2000.

Zanotto, E. D., and A. Galhardi, Experimental test of the general-theory of transformation kinetics—homogeneous nucleation in a Na2O.2CaO.3SiO2 Glass, *Journal Of Non-Crystalline Solids,* 104 (1), 73-80, 1988.

Zanotto, E. D., and P. F. James, Experimental Test Of The General-Theory Of Transformation Kinetics—Homogeneous Nucleation In A BaO.2SiO2 Glass, *Journal Of Non-Crystalline Solids,* 104(1), 70-72, 1988.

Conzone et al., Preparation and properties of radioactive rhenium glass microspheres intended for in vivo radioembolization therapy, Journal of Biomedical Materials Research, 42 (1998) 4, pp. 617-625.

The invention claimed is:

1. A method for preparing a glass-ceramic membrane, comprising preparing a conductive glass-ceramic comprising
   a) thermal processing a glass that contains an effective amount of a metal to achieve conductivity under a suitable atmosphere to produce a conductive glass-ceramic containing crystals in which the metal segregates to the grain boundaries of said crystals and forms an interconnected conductive network within the bulk of the glass-ceramic, or
   b) ion exchanging a glass powder with a metal, rinsing the resultant glass powder to remove metal that did not ion exchange with the glass powder, drying the powder, and sintering the powder under forming gas to form a glass-ceramic whose crystals contain said metal,
   and
   forming a membrane from said glass-ceramic.

2. In a method of hydrogen or proton separation, wherein the improvement comprises separating hydrogen or a proton with a glass-ceramic membrane prepared by a method according to claim 1.

3. A method for preparing a glass-ceramic membrane according to claim 1, comprising preparing a conductive glass-ceramic comprising
   a) thermal processing a glass that contains an effective amount of a metal to achieve conductivity under a suitable atmosphere to produce a conductive glass-ceramic containing crystals in which the metal segregates to the grain boundaries of said crystals and forms an interconnected conductive network within the bulk of the glass-ceramic,
   and
   forming a membrane from said glass-ceramic.

4. A method for preparing a glass-ceramic membrane according to claim 1, comprising preparing a conductive glass-ceramic comprising
   b) ion exchanging a glass powder with a metal, rinsing the resultant glass powder to remove metal that did not ion exchange with the glass powder, drying the powder, and sintering the powder under forming gas to form a glass-ceramic whose crystals contain said metal,
   and
   forming a membrane from said glass-ceramic.

5. In a method of hydrogen or proton separation, wherein the improvement comprises separating hydrogen or a proton with a glass-ceramic membrane prepared by a method according to claim 3.

6. In a method of hydrogen or proton separation, wherein the improvement comprises separating hydrogen or a proton with a glass-ceramic membrane prepared by a method according to claim 4.

7. A method according to claim 1, wherein the metal is silver, palladium, copper, iron, manganese, vanadium, chromium, nickel, cobalt, platinum, or gold.

8. A method according to claim 1, wherein the metal is silver.

9. A method according to claim 1, wherein the electrically conductive glass-ceramic has a conductance $>10^{-4}$ S/cm.

10. A method according to claim 1, wherein in a) a reducing agent and/or an oxidizing agent is used during thermal processing.

11. A method according to claim 10, wherein the reducing agent is sugar and the oxidizing agent is ammonium nitrate.

12. A method according to claim 1, wherein in a) a cover and/or bubbling gas is used during thermal processing.

13. A method according to claim 12, wherein the cover and/or bubbling gas is oxygen, nitrogen or argon, or a mixture thereof.

14. A method according to claim 1, wherein in a) a sugar is used as a reducing agent in conjunction with a reducing atmosphere during thermal processing.

15. A method according to claim 14, wherein the reducing atmosphere is 5% $H_2$ and 95% $N_2$ forming gas.

16. In a method of hydrogen or proton separation, wherein the improvement comprises separating hydrogen or a proton with a glass-ceramic membrane prepared by a method according to claim 15.

17. A method according to claim 1, wherein the glass-ceramic contains 0.1% to 10% of metal.

18. A method according to claim 1, wherein the glass-ceramic contains 1% to 5% of metal.

19. In a method of hydrogen or proton separation, wherein the improvement comprises separating hydrogen or a proton with a glass-ceramic membrane prepared by a method according to claim 17.

20. In a method of hydrogen or proton separation, wherein the improvement comprises separating hydrogen or a proton with a glass-ceramic membrane prepared by a method according to claim 18.

21. A method according to claim 1, wherein the glass-ceramic is a lithium disilicate glass ceramic.

22. A method according to claim 2, wherein the glass-ceramic is a lithium disilicate glass ceramic.

* * * * *